(12) United States Patent
Ma (10) Patent No.: US 11,974,032 B2
(45) Date of Patent: Apr. 30, 2024

(54) DISPLAY SCREEN AND DISPLAY DEVICE

(71) Applicant: Wuhan China Star Optoelectronics Semiconductor Display Technology Co., Ltd., Hubei (CN)

(72) Inventor: Weixin Ma, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 836 days.

(21) Appl. No.: 17/051,467

(22) PCT Filed: Sep. 11, 2020

(86) PCT No.: PCT/CN2020/114736
§ 371 (c)(1),
(2) Date: Oct. 29, 2020

(87) PCT Pub. No.: WO2022/011816
PCT Pub. Date: Jan. 20, 2022

(65) Prior Publication Data
US 2023/0345099 A1    Oct. 26, 2023

(30) Foreign Application Priority Data
Jul. 13, 2020  (CN) .......................... 202010670477.6

(51) Int. Cl.
*H04N 23/55*    (2023.01)
*H04N 23/90*    (2023.01)
*H04M 1/02*    (2006.01)

(52) U.S. Cl.
CPC ............. *H04N 23/55* (2023.01); *H04N 23/90* (2023.01); *H04M 1/0264* (2013.01); *H04M 1/0266* (2013.01)

(58) Field of Classification Search
CPC ..... H04N 23/55; H04N 23/90; H04M 1/0264; H04M 1/0266
USPC ...................................................... 361/679.02
See application file for complete search history.

(56) References Cited

U.S. PATENT DOCUMENTS

| 7,796,322 | B2 * | 9/2010 | Ratti ........................ G09G 3/34 |
| | | | 252/585 |
| 2019/0369422 | A1 * | 12/2019 | Zeng ..................... G06F 1/1626 |
| 2020/0312832 | A1 * | 10/2020 | Chi ....................... H10K 59/353 |

(Continued)

FOREIGN PATENT DOCUMENTS

| CN | 107277329 | 10/2017 |
| CN | 208386634 | 1/2019 |
| CN | 110493523 | 11/2019 |

(Continued)

*Primary Examiner* — Timothy J Thompson
*Assistant Examiner* — Michael F Mcallister (57) ABSTRACT

A display screen and a display device are disclosed. The display screen includes: a first camera area including a first pixel unit and a first light-transmitting area; a second camera area including a second pixel unit and a second light-transmitting area; and a display area surrounding the first camera area and the second camera area, wherein a position of the first pixel unit in the first camera area corresponds to a position of the second light-transmitting area in the second camera area, and a position of the second pixel unit in the second camera area corresponds to a position of the first light-transmitting area in the first camera area.

20 Claims, 4 Drawing Sheets (56) References Cited

U.S. PATENT DOCUMENTS

2022/0217226 A1* 7/2022 Jing .................. H10K 50/841

FOREIGN PATENT DOCUMENTS

| CN | 110610966 | 12/2019 |
| CN | 110769151 | 2/2020 |
| CN | 111405087 | 7/2020 |
| CN | 110231735 | 9/2022 |

* cited by examiner

DISPLAY SCREEN AND DISPLAY DEVICE

RELATED APPLICATIONS

This application is a National Phase of PCT Patent Application No. PCT/CN2020/114736 having International filing date of Sep. 11, 2020, which claims the benefit of priority of Chinese Patent Application No. 202010670477.6 filed on Jul. 13, 2020. The contents of the above applications are all incorporated by reference as if fully set forth herein in their entirety.

FIELD AND BACKGROUND OF THE INVENTION

The invention relates to the field of display, in particular to a display screen and a display device.

With the development of science and technology and the improvement of people's requirements for products, full-screen products with a high screen-to-body ratio have become a highly anticipated development trend of smart phones.

At present, the front camera of the mobile phone will occupy a certain screen space, resulting in a reduction in the screen-to-body ratio. In order to solve the above problems, those skilled in the art have proposed a solution as follows: a hole is opened on the screen of the mobile phone, and the front camera is placed under the opening of the screen. Meanwhile, pixels in the opening area of the screen are arranged in a density less than a normal display area to increase transmission of external light through the opening area. However, in order to maintain normal display at the opening area of the camera, those skilled in the art may set up some pixels in the opening are, which will block part of the incoming light, resulting in blurry imaging of the under-screen camera and reducing the imaging quality of the front camera module.

SUMMARY OF THE INVENTION

An object of the present invention is to provide a display screen and a display device to solve the technology problem in the prior art that the under-screen camera area is not provided with pixels and has no display function, since provision of pixels in the opening area will impact the shooting effect of the front camera.

In order to achieve the above object, the present invention provides a display screen, which includes a first camera area, a second camera area, and a display area, wherein the first camera area includes a first pixel unit and a first light-transmitting area; the second camera area includes a second pixel unit and a second light-transmitting area; and the display area surrounding the first camera area and the second camera area, wherein a position of the first pixel unit in the first camera area corresponds to a position of the second light-transmitting area in the second camera area, and a position of the second pixel unit in the second camera area corresponds to a position of the first light-transmitting area in the first camera area.

Further, the first camera area is divided into the first pixel unit and the first light-transmitting area; and the second camera area is divided into the second pixel unit and the second light-transmitting area.

Further, a distance between the first camera area and the second camera area ranges from 5 mm to 10 mm.

Further, the first camera area and the second camera area are arranged side by side.

Further, the display screen further includes a third camera area, wherein the third camera are is divided into a third pixel unit and a third light-transmitting area, and surrounded by the display area.

Further, a position of the third pixel unit in the third camera area corresponds to a position of a part of the first light-transmitting area in the first camera area; and the position of the first pixel unit in the first camera area corresponds to a position of a part of the third light-transmitting area in the third camera area; and/or the position of the third pixel unit in the third camera area corresponds to a position of a part of the second light-transmitting area in the second camera area; and the position of the second pixel unit in the second camera area corresponds to the position of the part of the third light-transmitting area in the third camera area.

Further, the first camera area, the second camera area, and the third camera area are located on a same plane and on a same straight line.

Further, the first pixel unit has a shape including at least one of a circle, a triangle, a square, or a diamond; and/or, the second pixel unit has a shape including at least one of a circle, a triangle, a square, or a diamond; and/or, the third pixel unit has a shape including at least one of a circle, a triangle, a square, or a diamond.

Further, the first pixel unit has a shape including at least one of a circle, a triangle, a square, or a diamond; and/or, the second pixel unit has a shape including at least one of a circle, a triangle, a square, or a diamond; and/or, the third pixel unit has a shape including at least one of a circle, a triangle, a square, or a diamond.

Further, the display area includes a fourth pixel unit; pixels of the first pixel unit are arranged in a density less than those of the fourth pixel unit; and pixels of the second pixel unit are arranged in a density less than those of the fourth pixel unit.

In order to achieve the above object, the present invention also provides a display device including the display screen as described above.

The technical effect of the present invention is to provide a display screen and a display device, which make the pixels of each of the camera areas compensate each other, and while ensuring the normal display of the camera area, increase the light transmittance of the camera areas to improve the shooting effect of the front camera, so that the captured pictures are bright and the background is clear, and the user experience is improved.

BRIEF DESCRIPTION OF THE SEVERAL VIEWS OF THE DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these FIGs. without paying creative work.

Elements in the drawings are designated by reference numerals listed below.

1 first camera area; 2 second camera area; 3 display area; 4 third camera area;
100 display screen; 11 first pixel unit; 12 first light-transmitting area;
21 second pixel unit; 22 second light-transmitting area;
31 fourth pixel unit; 41 third pixel unit; 42 third light-transmitting area.

DESCRIPTION OF SPECIFIC EMBODIMENTS OF THE INVENTION

The preferred embodiments of the present invention are described below with reference to the accompanying drawings, which are used to exemplify the embodiments of the present invention, which can fully describe the technical contents of the present invention to make the technical content of the present invention clearer and easy to understand. However, the present invention may be embodied in many different forms of embodiments, and the scope of the present invention is not particularly limited to the embodiments set forth herein.

This embodiment provides a display device including a display screen and a first camera and a second cameras which are arranged side by side.

Figure 1:
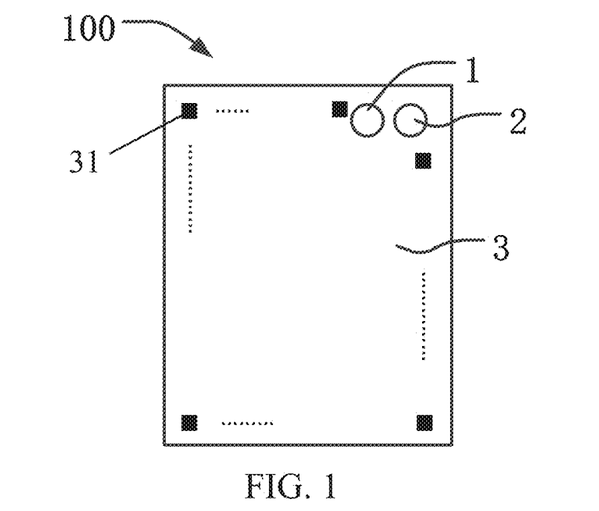
FIG. 1 is a schematic structural diagram of a display screen described in Embodiment 1.

As shown in FIG. 1, the present embodiment provides a display screen 100 including a first camera area 1, a second camera area 2, and a display area 3, wherein, the display area 3 surrounds the first camera area 1 and the second camera area 2, a position of the first camera corresponding to the display screen 100 is the first camera area 1, and a position of the second camera corresponding to the display screen 100 is the second camera area 2. In this embodiment, the first camera area 1 and the second camera area 2 are arranged side by side, and the distance between the first camera area 1 and the second camera area 2 is 5 mm to 10 mm to ensure that the first camera area 1 and the second camera area 2 obtain exactly the same shooting field of view, which improves the clarity of the picture. The distance between the first camera area 1 and the second camera area 2 refers to a distance from a center of the first camera area 1 to a center of the second camera area 2. The distance between the first camera area 1 and the second camera area 2 is preferably 5.5 mm, 6 mm, 6.5 mm, or 7 mm, so that the first camera area 1 and the second camera area 2 can obtain the same field of view.

Figure 2:
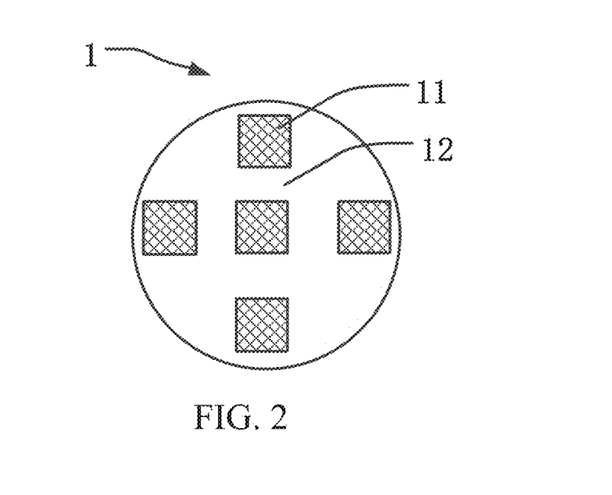
FIG. 2 is a schematic structural diagram of the first camera area described in Embodiment 1.

As shown in FIG. 2, the first camera area 1 includes a first pixel unit 11 and a first light-transmitting area 12. Specifically, the first camera area 1 is divided into a first pixel unit 11 and a first light-transmitting area 12. The first pixel unit 11 includes a red sub-pixel (R), a green sub-pixel (G), and a blue sub-pixel (B), to realize the function of color display. The first light-transmitting area 12 allows external light to pass there through to increase the transmittance of the camera. A shape of the first pixel unit 11 includes at least one of a circle, a triangle, a square, or a diamond.

Figure 3:
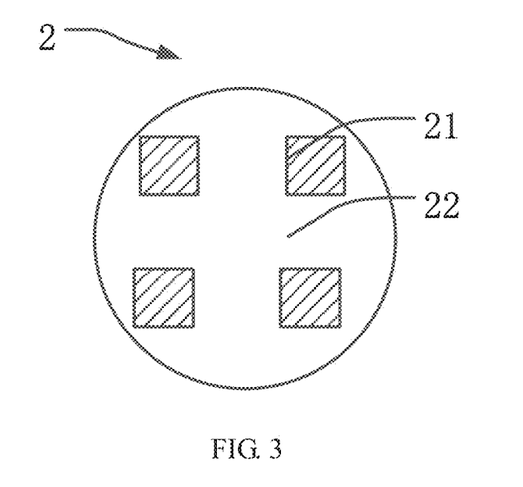
FIG. 3 is a schematic structural diagram of a second camera area described in Embodiment 1.

As shown in FIG. 3, the first camera area 2 includes a second pixel unit 21 and a second light-transmitting area 22. Specifically, the second camera area 2 is divided into a second pixel unit 21 and a second light-transmitting area 22. The second pixel unit 21 includes a red sub-pixel (R), a green sub-pixel (G), and a blue sub-pixel (B), to realize the function of color display. The second light-transmitting area 22 allows external light to pass there through to increase the transmittance of the camera. A shape of the second pixel unit 12 includes at least one of a circle, a triangle, a square, or a diamond. The shape of the second pixel unit 12 and the shape of the first pixel unit 11 may be the same or different, which is not particularly limited in this embodiment.

As shown in FIG. 2 to FIG. 3, a position of the first pixel unit 11 in the first camera area 1 corresponds to the second light-transmitting area 22 in the second camera area 2; a position of the second pixel unit 21 in the second camera area 2 corresponds to the first light-transmitting area 12 in the first camera area 11. In short, the pixel units of the first camera area 1 and the pixel units of the second camera area 2 are staggered with each other. The first pixel unit 11 is disposed in the first camera area 1, while no pixel unit is disposed in the second camera area 2. Similar, the second pixel unit 21 is arranged in the second camera area 2, while no pixel unit is arranged in the first camera area 1.

The pixel units of the first camera area 11 and the second camera area 21 compensate each other. When the camera is shooting through a corresponding one of the camera areas, the light transmittance of the camera area is increased to improve the shooting effect of the front camera, thereby ensuring the imaging quality, such that the pictures is taken with higher resolution. In addition, when the two camera areas are not shooting an image, the two camera areas can realize the function of normal display and realize full screen display. Therefore, the first camera area 1 and the second camera area 2 can implement both a shooting function and a display function, thereby improving user experience.

Specifically, when taking a picture, the first step is to activate the display device to shoot an image, and at this time, the first camera area is converted from a grayscale display state to a transparent state for external light to enter the first camera through the first light-transmitting area. The second camera area is set in the same way as the first camera area. In the second step, the first camera and the second camera are activated synchronously, to get the same screen at the same time, and the first camera and the second camera acquire the first image and the second image, respectively. In the first image, the picture corresponding to the position of the first pixel unit forms a first shielding area, and in the second image, the picture corresponding to the position of the second pixel unit forms a second shielding area. Since the pixel units of the first camera area and the pixel units of the second camera area are staggered with each other, for the same reason, the first shielding area and the second shielding area are staggered with each other. In the third step, a processor of the display device performs deletion processing on the first shielding area of the first image, and performs deletion processing on the second shielding area of the second image, followed by fusing a clear part of the first image and a clear part of the second image to obtain a picture with clear brightness and clear background.

When shooting, the first step of shooting is exactly the same as the first step of taking a picture. In the second step, shooting frequencies of the first camera and the second camera are exactly the same, that is, the same image is acquired at the same time point, and in other words, when shooting, by performing the second step of taking a picture to acquire multiple frames of images continuously. In the third step, the images acquired by the first camera and the second camera at the same time point are fused, that is, the third step of taking a picture is executed, then the multiple frames of images are fused, and after that, images with clear brightness and clear background are obtained. In this embodiment, the display area 3 includes a fourth pixel unit 31. The pixels of the first pixel unit 11 is smaller than that of the fourth pixel unit 31, so as to increase the transmission of the first camera area 1 for external light and improve the transmission. The shooting effect of the first camera area 1. The pixels of the second pixel unit 21 are arranged in a density less than those of the fourth pixel unit 31, so as to increase the transmission of the second camera area 2 for external light and improve the shooting effect through the second camera area 2. The fourth pixel unit 31 includes a red sub-pixel (R), a green sub-pixel (G), and a blue sub-pixel (B) to realize the function of color display.

It should be noted that since the pixels of the first pixel unit 11 are arranged in a density less than those of the fourth pixel unit 31, the pixels of the second pixel unit 21 are arranged in a density less than those of the fourth pixel unit 31. Therefore, the resolution of the first camera area 1 is smaller than the resolution of the display area 3, and the resolution of the second camera area 2 is smaller than the resolution of the display area 3. When the display screen 100 displays images, the sudden change from the first camera area 1 to the display area 3 and the sudden change from the second camera area 2 to the display area 3 may make the user observe unclear images displaying in some areas, which reduces the user experience.

Figure 4:
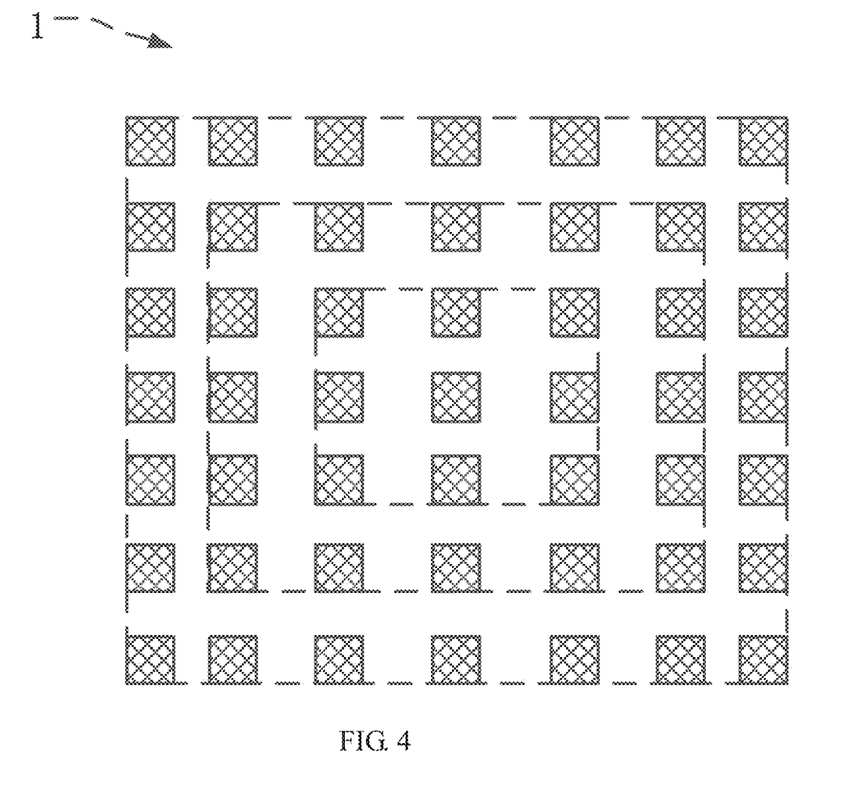
FIG. 4 is a schematic structural diagram of a first pixel unit described in Embodiment 1.

As shown in FIG. 4, in the direction from the center of the first camera area 1 to the display area 3, the distance between adjacent ones of the pixels in the first camera area 1 is reduced, so that the sudden change from the display area 3 to the first camera area 1 decreases, and the resolution of the first camera area 1 gradually decreases. Similarly, the distance between adjacent ones of the pixels in the second camera area is also reduced, so that the sudden change from the display area to the second camera area decreases, and the resolution of the second camera area gradually decreases. Therefore, it is possible to achieve imaging with a better resolution while ensuring the shooting effect, which improves the user experience.

Embodiment 2

This embodiment provides a display screen and a display device, including most of the technical features of Embodiment 1 except the difference that this embodiment further includes a third camera area.

Figure 5:
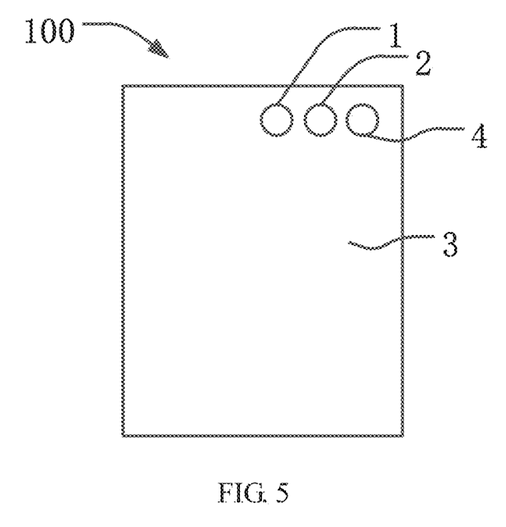
FIG. 5 is a schematic structural diagram of a display screen in Embodiment 2.

As shown in FIG. 5, the display screen 100 includes a first camera area 1, a second camera area 2, a third camera area 4, and a display area 3, wherein, the display area 3 surrounds the first camera area 1, the second camera area 2, and the third camera area 4. In this embodiment, the first camera area 1, the second camera area 2, and the third camera area 4 are located in the same plane and on the same straight line. The distance between adjacent ones of the camera areas is 5 mm to 10 mm to ensure that the adjacent ones of the camera areas obtain exactly the same shooting field of view, which improves the clarity of the picture. The distance between adjacent ones of the camera areas refers to a distance from a center of one of the camera areas to a center of another one of the camera areas. The distance between adjacent ones of the camera areas is preferably 5.5 mm, 6 mm, 6.5 mm, or 7 mm, so that all the second camera areas can obtain the same field of view.

Figure 6:
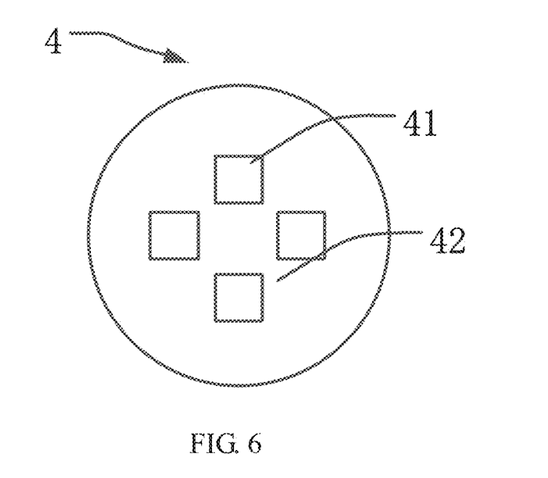
FIG. 6 is a schematic structural diagram of a third camera area described in Embodiment 2.

As shown in FIG. 6, the third camera area 4 is divided into a third pixel unit 41 and a third light-transmitting area 42. Specifically, a position of the third pixel unit 41 in the third camera area 4 corresponds to a part of the first light-transmitting area 12 in the first camera area 1; and a position of the first pixel unit 11 in the first camera area 1 corresponds to a part of the third light-transmitting area 42 in the third camera area 4; and/or, the position of the third pixel unit 41 in the third camera area 4 corresponds to a part of the second light-transmitting area 22 in the second camera area 2; and a position of the second pixel unit 21 in the second camera area 2 corresponds to a part of the third light-transmitting area 42 in the third camera area 4. The third camera area 4 includes a red sub-pixel (R), a green sub-pixel (G), and a blue sub-pixel (B) to realize the function of color display.

Figure 7:
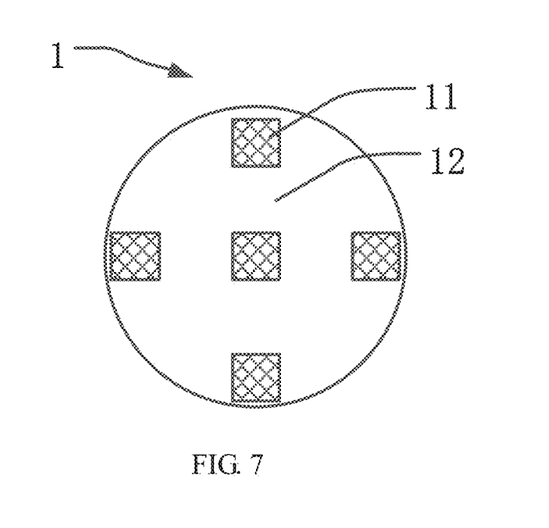
FIG. 7 is a schematic structural diagram of a first camera area according to Embodiment 2.
Figure 8:
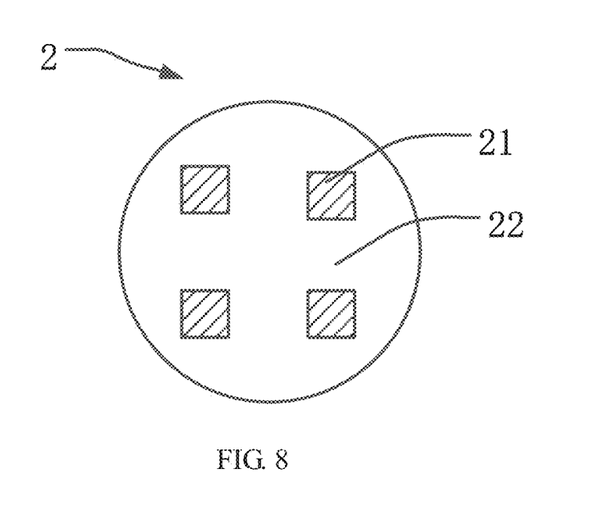
FIG. 8 is a schematic structural diagram of a second camera area described in Embodiment 2.

As shown in FIG. 6 to FIG. 8, the shape of each of the first pixel unit 11, the second pixel unit 21, and the third pixel unit 41 includes at least one of a circle, a triangle, a square, or a diamond. The shape of the first pixel unit 11 may be the same as or different from the shape of each of the second pixel unit 21 and the third pixel unit 41, which is not particularly limited in this embodiment.

In this embodiment, the display area 3 includes a fourth pixel unit 31. The pixels of the first pixel unit 11 are arranged in a density less than those of the fourth pixel unit 31, so as to increase the transmission of the first camera area 1 for external light and improve the shooting effect through the first camera area 1. The pixels of the second pixel unit 21 are arranged in a density less than those of the fourth pixel unit 31, so as to increase the transmission of the second camera area 2 for external light and improve the shooting effect through the second camera area 2. The pixels of the third pixel unit 41 are arranged in a density less than those of the fourth pixel unit 31, so as to increase the transmission of the third camera area 4 for external light and improve the shooting effect through the third camera area 4.

It should be noted that since the pixels of the first pixel unit 11 are arranged in a density less than those of the fourth pixel unit 31, the pixels of the second pixel unit 21 are arranged in a density less than those of the fourth pixel unit 31, and pixels of the third pixel unit 41 are arranged in a density less than those of the fourth pixel unit 31, the resolution of the first camera area 1 is less than the resolution of the display area 3, the resolution of the second camera area 2 is less than the resolution of the display area 3, and the resolution of the third camera area 4 is less than the resolution of the display area 3. When the display screen 100 displays images, the sudden change from the first camera area 1 to the display area 3, the sudden change from the second camera area 2 to the display area 3, and the sudden change from the third camera area 4 to the display area 3 may make the user observe unclear images displaying in some areas, which reduces the user experience.

As shown in FIG. 4, in the direction from the center of the first camera area 1 to the display area 3, the distance between adjacent ones of the pixels in the first camera area 1 is reduced, so that the sudden change from the display area 3 to the first camera area 1 decreases, and the resolution of the first camera area 1 gradually decreases. Similarly, the distance between adjacent ones of the pixels in the second camera area and the third camera area is also reduced, so that the sudden change from the display area to the second camera area and the third camera area decreases, and the resolution of the second camera area and the third camera area gradually decreases. Therefore, it is possible to achieve imaging with a better resolution while ensuring the shooting effect, which improves the user experience.

This embodiment also provides a display device, which includes the aforementioned display screen and three cameras arranged in a straight line in a same plane. When the camera is shooting, first, the display screen displays a shooting interface of the camera, the first camera acquires the image of the shooting interface through the first camera area, the second camera acquires the image of the shooting interface through the second camera area, and the third camera acquires the image of the shooting interface through the third camera area. Second, the cameras are activated, and the auto-focus processing of shooting a scene is activated. Third, the display device receives the signals of user's shooting operation, and corresponding to the shooting operation, acquires the first image shot by the first camera, the second image shot by the second camera, and the third image shot by the third camera. Finally, a processor of the display device is configured to perform fusion processing on the first image, the second image, and the third image to obtain a picture. The pixels of the picture include the first pixel unit, the second pixel unit, and the third pixel unit to obtain a picture with clear brightness and clear background. Compared with Embodiment 1, the sharpness of the pictures obtained through the display screen is greater than that of the pictures obtained through the display screen of Embodiment 1.

In other embodiments, the display screen may also be provided with more than three camera areas, so as to obtain pictures with clearer brightness and high-definition background.

The technical effect of the present invention is to provide a display screen and a display device, which make the pixels of each of the camera areas compensate each other, and while ensuring the normal display of the camera area, increase the light transmittance of the camera areas to improve the shooting effect of the front camera, so that the captured pictures are bright and the background is clear, and the user experience is improved.

The above are only the preferred embodiments of the present invention. It should be noted that for those of ordinary skill in the art, without departing from the principles of the present invention, several improvements and modifications can be made, which should be regarded as the protection scope of the present invention.

What is claimed is:

1. A display screen, comprising:
a first camera area comprising a first pixel unit and a first light-transmitting area;
a second camera area comprising a second pixel unit and a second light-transmitting area; and
a display area surrounding the first camera area and the second camera area,
wherein a position of the first pixel unit in the first camera area corresponds to a position of the second light-transmitting area in the second camera area, and
a position of the second pixel unit in the second camera area corresponds to a position of the first light-transmitting area in the first camera area.

2. The display screen according to claim 1, wherein
the first camera area is divided into the first pixel unit and the first light-transmitting area; and
the second camera area is divided into the second pixel unit and the second light-transmitting area.

3. The display screen according to claim 1, wherein a distance between the first camera area and the second camera area ranges from 5 mm to 10 mm.

4. The display screen according to claim 1, wherein the first camera area and the second camera area are arranged side by side.

5. The display screen according to claim 1, further comprising a third camera area, wherein the third camera area is divided into a third pixel unit and a third light-transmitting area, and surrounded by the display area.

6. The display screen according to claim 5, wherein
a position of the third pixel unit in the third camera area corresponds to a position of a part of the first light-transmitting area in the first camera area, and the position of the first pixel unit in the first camera area corresponds to a position of a part of the third light-transmitting area in the third camera area; and/or
the position of the third pixel unit in the third camera area corresponds to a position of a part of the second light-transmitting area in the second camera area, and the position of the second pixel unit in the second camera area corresponds to a position of a part of the third light-transmitting area in the third camera area.

7. The display screen according to claim 5, wherein
the first camera area, the second camera area, and the third camera area are located on a same plane and on a same straight line.

8. The display screen according to claim 1, wherein
the first pixel unit has a shape comprising at least one of a circle, a triangle, a square, or a diamond; and/or,
the second pixel unit has a shape comprising at least one of a circle, a triangle, a square, or a diamond; and/or,
the third pixel unit has a shape comprising at least one of a circle, a triangle, a square, or a diamond.

9. The display screen according to claim 5, wherein
the first pixel unit has a shape comprising at least one of a circle, a triangle, a square, or a diamond; and/or,
the second pixel unit has a shape comprising at least one of a circle, a triangle, a square, or a diamond; and/or,
the third pixel unit has a shape comprising at least one of a circle, a triangle, a square, or a diamond.

10. The display screen according to claim 1, wherein
the display area comprises a fourth pixel unit;
pixels of the first pixel unit are arranged in a density less than those of the fourth pixel unit; and
pixels of the second pixel unit are arranged in a density less than those of the fourth pixel unit.

11. A display device, comprising the display screen according to claim 1, wherein the display screen comprises
a first camera area comprising a first pixel unit and a first light-transmitting area;
a second camera area comprising a second pixel unit and a second light-transmitting area; and
a display area surrounding the first camera area and the second camera area,
wherein a position of the first pixel unit in the first camera area corresponds to a position of the second light-transmitting area in the second camera area, and
a position of the second pixel unit in the second camera area corresponds to a position of the first light-transmitting area in the first camera area.

12. The display device according to claim 11, wherein
the first camera area is divided into the first pixel unit and the first light-transmitting area; and
the second camera area is divided into the second pixel unit and the second light-transmitting area.

13. The display device according to claim 11, wherein a distance between the first camera area and the second camera area ranges from 5 mm to 10 mm.

14. The display device according to claim 11, wherein the first camera area and the second camera area are arranged side by side.

15. The display device according to claim 11, wherein the display screen further comprises a third camera area, the third camera area is divided into a third pixel unit and a third light-transmitting area, and surrounded by the display area.

16. The display device according to claim 15, wherein
a position of the third pixel unit in the third camera area corresponds to a position of a part of the first light-transmitting area in the first camera area, and the position of the first pixel unit in the first camera area corresponds to a position of a part of the third light-transmitting area in the third camera area; and/or
the position of the third pixel unit in the third camera area corresponds to a position of a part of the second light-transmitting area in the second camera area, and the position of the second pixel unit in the second camera area corresponds to a position of a part of the third light-transmitting area in the third camera area.

17. The display device according to claim 15, wherein the first camera area, the second camera area, and the third camera area are located on a same plane and on a same straight line.

18. The display device according to claim 11, wherein
the first pixel unit has a shape comprising at least one of a circle, a triangle, a square, or a diamond; and/or,
the second pixel unit has a shape comprising at least one of a circle, a triangle, a square, or a diamond; and/or,
the third pixel unit has a shape comprising at least one of a circle, a triangle, a square, or a diamond.

19. The display device according to claim 15, wherein
the first pixel unit has a shape comprising at least one of a circle, a triangle, a square, or a diamond; and/or,
the second pixel unit has a shape comprising at least one of a circle, a triangle, a square, or a diamond; and/or,
the third pixel unit has a shape comprising at least one of a circle, a triangle, a square, or a diamond.

20. The display device according to claim 11, wherein
the display area comprises a fourth pixel unit;
pixels of the first pixel unit are arranged in a density less than those of the fourth pixel unit; and
pixels of the second pixel unit are arranged in a density less than those of the fourth pixel unit.

* * * * *